US012489247B2

(12) United States Patent
Brandt et al.

(10) Patent No.: US 12,489,247 B2
(45) Date of Patent: Dec. 2, 2025

(54) ELECTRICAL CONNECTOR HAVING TERMINAL POSITION ASSURANCE DEVICE

(71) Applicant: TE Connectivity Solutions GmbH, Schaffhausen (CH)

(72) Inventors: Christian Perry Brandt, Middletown, PA (US); John Wesley Hall, Harisburg, PA (US)

(73) Assignee: TE Connectivity Solutions GmbH (CH)

( * ) Notice: Subject to any disclaimer, the term of this patent is extended or adjusted under 35 U.S.C. 154(b) by 381 days.

(21) Appl. No.: 17/994,509

(22) Filed: Nov. 28, 2022

(65) Prior Publication Data

US 2024/0178615 A1 May 30, 2024

(51) Int. Cl.

| | |
|---|---|
| ***H01R 13/629*** | (2006.01) |
| ***H01R 13/502*** | (2006.01) |
| ***H01R 13/52*** | (2006.01) |
| ***H01R 13/627*** | (2006.01) |
| *H01R 107/00* | (2006.01) |

(52) U.S. Cl.

CPC ......... *H01R 13/629* (2013.01); *H01R 13/502* (2013.01); *H01R 13/5205* (2013.01); *H01R 13/6275* (2013.01); *H01R 2107/00* (2013.01); *H01R 2201/26* (2013.01)

(58) Field of Classification Search

CPC ........................... H01R 13/629; H01R 13/502; H01R 13/5205; H01R 13/6275; H01R 2107/00; H01R 2201/26; H01R 24/86; H01R 13/40; H01R 13/02

See application file for complete search history.

(56) References Cited

U.S. PATENT DOCUMENTS

2003/0176107 A1* 9/2003 Hall .................. H01R 13/4364 439/595
2009/0247011 A1* 10/2009 Myer ................. H01R 13/4223 439/595
2017/0271815 A1* 9/2017 Lane .................. H01R 13/6272
2019/0173220 A1* 6/2019 Bhat .................. H01R 13/4362
2024/0178615 A1* 5/2024 Brandt ................. H01R 13/502

* cited by examiner

*Primary Examiner* — Abdullah A Riyami
*Assistant Examiner* — Nader J Alhawamdeh

(57) ABSTRACT

An electrical connector includes a housing having a cavity extending between a mating end and a cable end. The housing has contact channels extends along channel axes. The electrical connector includes a contact assembly received in the cavity having contacts received in the corresponding contact channels. Each contact has a retention feature. The electrical connector includes a TPA device received in the cavity that extends along an axis parallel to the channel axes. The TPA device includes locking lobes each configured to interface with the retention feature of the corresponding contact to hold the contact in the housing. The TPA device is rotatable about the axis relative to the housing between a clearance position and a blocking position. Each locking lobe interfaces with the corresponding retention feature in the blocking position.

19 Claims, 10 Drawing Sheets

ELECTRICAL CONNECTOR HAVING TERMINAL POSITION ASSURANCE DEVICE

BACKGROUND OF THE INVENTION

The subject matter herein relates generally to electrical connectors.

Radio frequency (RF) coaxial connector assemblies have been used for numerous applications including military applications and automotive applications, such as global positioning systems (GPS), antennas, radios, mobile phones, multimedia devices, and the like. The connector assemblies are typically coaxial cable connectors that are provided at the end of coaxial cables.

In order to standardize various types of connector assemblies, particularly the interfaces for such connector assemblies, certain industry standards have been established. One of these standards is referred to as mini-Coax per SAE/USCAR-49. SAE/USCAR is the Automotive Standards Committee, representing international standardization interests in the automotive field. The SAE/USCAR standard provides a system, based on keying and color coding, for proper connector attachment.

Some known connector assemblies utilize terminal position assurance (TPA) devices to assure proper positioning of the contacts in the housings of the connector assemblies. The TPA devices are typically side actuated from an exterior side of the housing after the contacts are loaded into the housing. Such TPA devices pass through the exterior wall of the housing. However, it may be desirable to seal the interior of the connector assemblies, such as to seal the interfaces between the contacts. It is difficult to seal the opening in the housing for the TPA device.

A need remains for an electrical connector having a terminal position assurance device that overcomes known problems with conventional electrical connectors.

BRIEF DESCRIPTION OF THE INVENTION

In one embodiment, an electrical connector is provided and includes a housing having a cavity. The housing has a mating end and a cable end. The housing has contact channels extending along channel axes. The electrical connector includes a contact assembly received in the cavity. The contact assembly includes contacts received in the corresponding contact channels. Each contact has a retention feature. The electrical connector includes a terminal position assurance (TPA) device positioned in the cavity. The TPA device extends along an axis parallel to the channel axes. The TPA device includes locking lobes. Each locking lobe configured to interface with the retention feature of the corresponding contact to hold the contact in the housing. The TPA device is rotatable about the axis relative to the housing between a clearance position and a blocking position. Each locking lobe interfaces with the corresponding retention feature in the blocking position.

In another embodiment, an electrical connector is provided and includes an outer housing having a cavity. The outer housing extends between a mating end and a cable end. The outer housing includes cable channels extends along cable channel axes. The electrical connector includes an inner housing received in the cavity. The inner housing includes contact channels extending along channel axes and is aligned with the cable channels. The inner housing includes an inner bore located adjacent to the contact channels. The electrical connector includes a contact assembly received in the cavity. The contact assembly includes contacts received in the corresponding contact channels and cables terminated to the contacts received in the corresponding cable channels. Each contact has a retention feature. The electrical connector includes a terminal position assurance (TPA) device received in the cavity. The TPA device includes a barrel and a hub. The barrel extends along an axis parallel to the channel axes. The barrel is received in the inner bore and located adjacent to the contacts in the contact channels. The hub includes locking lobes that extend radially outward from the hub. The TPA device is rotatable about the axis relative to the inner housing between a clearance position and a blocking position. The locking lobes are offset from the contact channels in the clearance position. The locking lobes are positioned in the contact channels in the blocking position for interfaces with the corresponding retention feature of the corresponding contact to hold the contact in the contact channel.

In another embodiment, a communication system is provided and includes a receptacle connector including a receptacle housing containing a cavity. The receptacle housing has a mating end and a cable end. The receptacle housing has receptacle contact channels extending along channel axes. The receptacle connector includes a receptacle contact assembly received in the cavity of the receptacle housing. The receptacle contact assembly includes receptacle contacts received in the corresponding receptacle contact channels. Each receptacle contact has a retention feature. The receptacle connector includes a receptacle terminal position assurance (TPA) device received in the cavity of the receptacle housing. The receptacle TPA device extends along an axis parallel to the channel axes. The receptacle TPA device includes receptacle locking lobes. Each receptacle locking lobe configured to interface with the retention feature of the corresponding receptacle contact to hold the receptacle contact in the receptacle housing. The receptacle TPA device is rotatable about the axis relative to the receptacle housing between a clearance position and a blocking position. Each receptacle locking lobe interfaces with the retention feature of the corresponding receptacle contact in the blocking position. The electrical connector includes a plug connector including a plug housing with a cavity. The plug housing has a mating end and a cable end. The mating end of the plug connector is plugged into the cavity of the receptacle housing at the mating end of the receptacle housing. The plug housing has plug contact channels extends along channel axes. The plug connector includes a plug contact assembly received in the cavity of the plug housing. The plug contact assembly includes plug contacts received in the corresponding plug contact channels. Each plug contact has a retention feature. The plug connector includes a plug terminal position assurance (TPA) device received in the cavity of the plug housing. The plug TPA device extends along an axis parallel to the channel axes. The plug TPA device includes plug locking lobes. Each plug locking lobe configured to interface with the retention feature of the corresponding plug contact to hold the plug contact in the plug housing. The plug TPA device is rotatable about the axis relative to the plug housing between a clearance position and a blocking position. Each plug locking lobe interfaces with the retention feature of the corresponding plug contact in the blocking position.

DETAILED DESCRIPTION OF THE INVENTION

Figure 1:
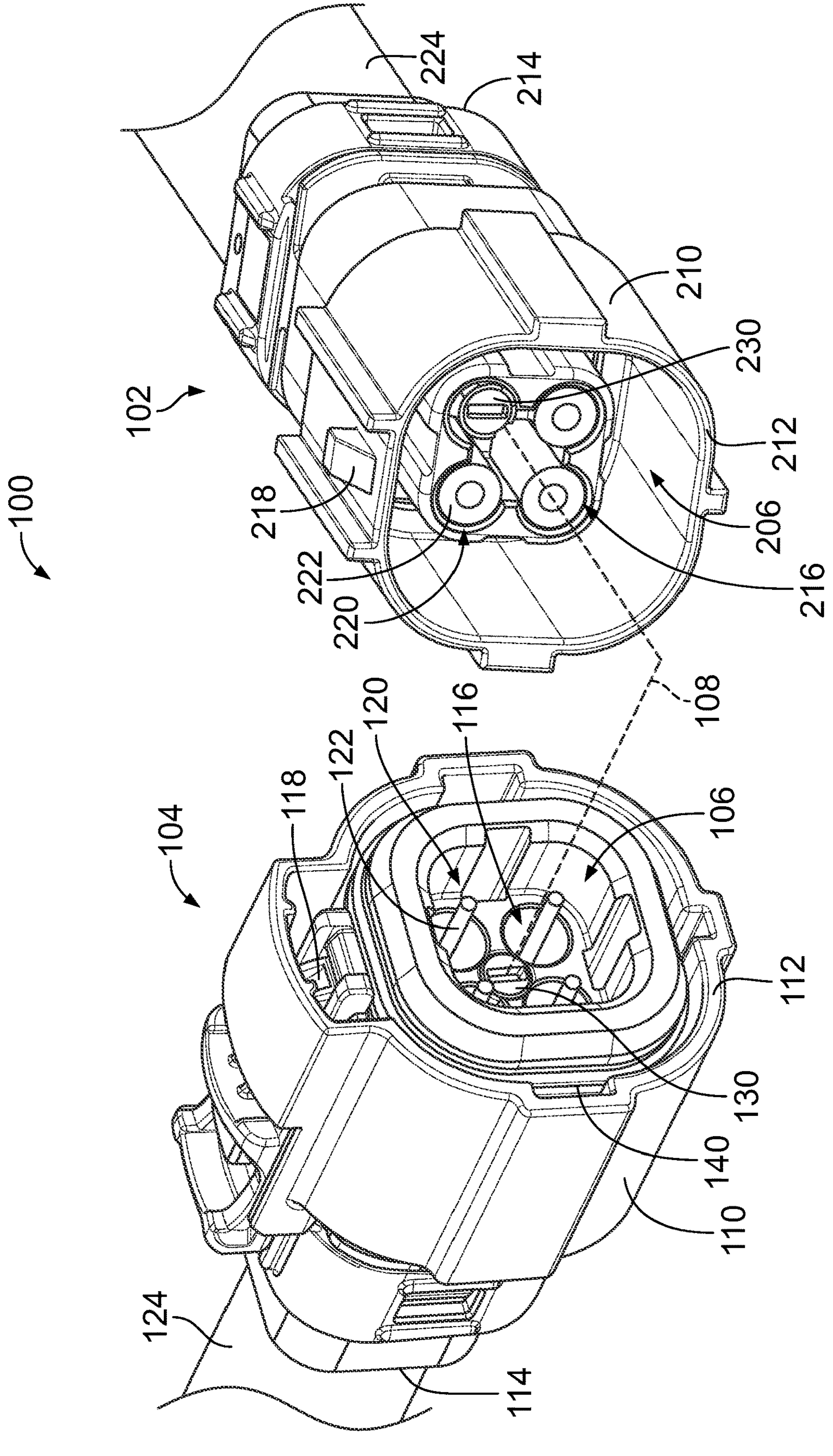
FIG. 1 is a perspective view of a connector system formed in accordance with an embodiment.

FIG. 1 is a perspective view of a connector system 100 formed in accordance with an embodiment. The connector system 100 includes a first electrical connector 102 and a second electrical connector 104. FIG. 1 has one of the contacts of the first electrical connector 102 removed to illustrate other components of the first electrical connector 102. In the illustrated embodiment, the first electrical connector 102 is a receptacle connector (receptacle connector 102) and the second electrical connector 104 is a plug connector (plug connector 104) configured to be plugged into the receptacle connector during a mating operation. Although shown as un-mated in FIG. 1, the first and second electrical connectors 102, 104 are poised for mating along a mating axis 108. Either the first electrical connector 102 or the second electrical connector 104 may be referred to as simply electrical connector or may be referred to as mating connector when compared to the other electrical connector.

The plug connector 104 includes a plug housing 110 having a cavity 106. The plug housing 110 extends between a mating end 112 and a cable end 114. The plug housing 110 has contact channels 116 extending along channel axes. The plug housing 110 includes a latch 118 at the mating end 112 for securely coupling the receptacle connector 102 to the plug connector 104. The latch 118 may be released to uncouple the receptacle connector 102 from the plug connector 104. In an exemplary embodiment, the plug connector 104 includes a seal 140 for sealed mating with the receptacle connector 102.

The plug connector 104 including a contact assembly 120 received in the cavity 106 of the plug housing 110. The contact assembly 120 includes contacts 122 received in the corresponding contact channels 116 and cables 124 terminated to the contacts 122 and extending from the cable end 114 of the plug housing 110. The contacts 122 may be secured in the contact channels 116 using latches. In an exemplary embodiment, the plug connector 104 includes secondary latching features, which may be defined by a terminal position assurance (TPA) device 130 operated to assure that the contacts 122 are properly positioned in the contact channels 116 and used to hold the contacts 122 in the contact channels 116. In an exemplary embodiment, each contact 122 includes a retention feature and the TPA device 130 interfaces with the retention features to retain the contacts 122 in the contact channels 116. In the illustrated embodiment, the contacts 122 are pin contacts. However, other types of contacts may be used in alternative embodiments, such as socket contacts, spring contacts, blade contacts, and the like.

The plug connector 104 includes the TPA device 130. The TPA device 130 is received in the cavity 106 of the plug housing 110. The TPA device 130 extends along an axis parallel to the channel axes. The TPA device 130 includes locking lobes configured to interface with the retention features of the corresponding contacts 122 to hold the contacts 122 in the plug housing 110. In an exemplary embodiment, the TPA device 130 is generally cylindrical. The TPA device 130 may be rotatable about the axis relative to the plug housing 110 between a clearance position and a blocking position. For example, the TPA device 130 may be rotated clockwise to move between the clearance position and the blocking position and may be rotated counter-clockwise to move between the blocking position and the clearance position, or vice versa. The locking lobes interface with the retention features of the corresponding contacts 122 in the blocking position to hold the contacts 122 in the plug housing 110.

The receptacle connector 102 includes a receptacle housing 210 having a cavity 206. The receptacle 210 extends between a mating end 212 and a cable end 214. The mating end 212 is configured to be received into the cavity 106 of the plug housing 110. The receptacle housing 210 has contact channels 216 extending along channel axes. The receptacle housing 210 includes a latching element 218 at the mating end 212. The latch 118 of the plug connector 104 interfaces with the latching element 218 to securely couple the receptacle connector 102 to the plug connector 104. Other types of securing features may be used in alternative embodiments.

The receptacle connector 102 including a contact assembly 220 received in the cavity 206 of the receptacle housing 210. The contact assembly 220 includes contacts 222 received in the corresponding contact channels 216 and cables 224 terminated to the contacts 222 and extending from the cable end 214 of the receptacle housing 210. The contacts 222 may be secured in the contact channels 216 using latches. In an exemplary embodiment, the receptacle connector 102 includes secondary latching features, which may be defined by a terminal position assurance (TPA) device 230 (visible in FIG. 1 because one of the contacts 222 is removed from the corresponding contact channel 216) operated to assure that the contacts 222 are properly positioned in the contact channels 216 and used to hold the contacts 222 in the contact channels 216. In an exemplary embodiment, each contact 222 includes a retention feature and the TPA device 230 interfaces with the retention features to retain the contacts 222 in the contact channels 216. In the illustrated embodiment, the contacts 222 are socket contacts. However, other types of contacts may be used in alternative embodiments, such as pin contacts, spring contacts, blade contacts, and the like.

The receptacle connector 102 includes the TPA device 230. The TPA device 230 is received in the cavity 206 of the receptacle housing 210. The TPA device 230 extends along an axis parallel to the channel axes. The TPA device 230 includes locking lobes configured to interface with the retention features of the corresponding contacts 222 to hold the contacts 222 in the receptacle housing 210. In an exemplary embodiment, the TPA device 230 is generally cylindrical. The receptacle TPA device 230 may be rotatable about the axis relative to the receptacle housing 210 between a clearance position and a blocking position. For example, the TPA device 230 may be rotated clockwise to move between the clearance position and the blocking position and may be rotated counter-clockwise to move between the blocking position and the clearance position, or vice versa. The locking lobes interface with the retention features of the corresponding contacts in the blocking position to hold the contacts 222 in the receptacle housing 210.

The connector system 100 may be used in numerous applications across various industries, such as the automotive industry, the home appliance industry, the aviation industry, and the like, to electrically couple two or more devices and/or electrical components. For example, in the automotive industry, the electrical connectors 102, 104 may be used for radio frequency communications, such as to electrically connect an antenna to a controller and/or processing device.

The receptacle connector 102 and the plug connector 104 each electrically connect to different electrical components and provide a conductive pathway between the corresponding electrical components. In the illustrated embodiment, the receptacle connector 102 and the plug connector 104 are electrically connected to the corresponding conductive cables or wires 124, 224, such as coaxial cables. In an alternative embodiment, the receptacle connector 102 and/or the plug connector 104 may be mounted (e.g., edge-mounted) to a corresponding circuit board and electrically connected to the circuit board rather than the cables 124 or 224. The cables 224 are electrically terminated (e.g., crimped, soldered, etc.) to the contacts 222 of the receptacle connector 102. The cables 124 are electrically terminated to the contacts 122 of the plug connector 104. The contacts 222 of the receptacle connector 102 engage the contacts 122 of the plug connector 104 when the connectors 102, 104 are mated. Various electrical signals conveying power, control messages, data, or the like, may be transmitted through the connectors 102, 104 between the cables 224 and the cables 124. The cables 124 may be twin-axial cables, such as having two conductors, which may convey differential signals.

The receptacle connector 102 and the plug connector 104 both have in-line shapes in the illustrated embodiment. For example, the mating axis 108 along which the receptacle connector 102 is loaded into the cavity 106 is generally parallel to the orientation of the cables 224 exiting the receptacle connector 102 and the cables 124 exiting the plug connector 104. In an alternative embodiment, the receptacle connector 102 and/or the plug connector 104 may have a right angle or other angle shape (for example, cable end oriented perpendicular to mating end).

Optionally, the first and second electrical connectors 102, 104 in the connector system 100 may be standardized connectors, such as SAE/USCAR standardized connectors. SAE/USCAR is the Automotive Standards Committee, representing international standardization interests in the automotive field. The SAE/USCAR standard provides a system, based on keying and color coding, for proper connector attachment. For example, keying ridges and key grooves on the electrical connectors 102, 104 may be features designed according to desired specifications for restricting the mateability of each of the electrical connectors 102, 104 to one or more specific mating connectors.

Figure 2:
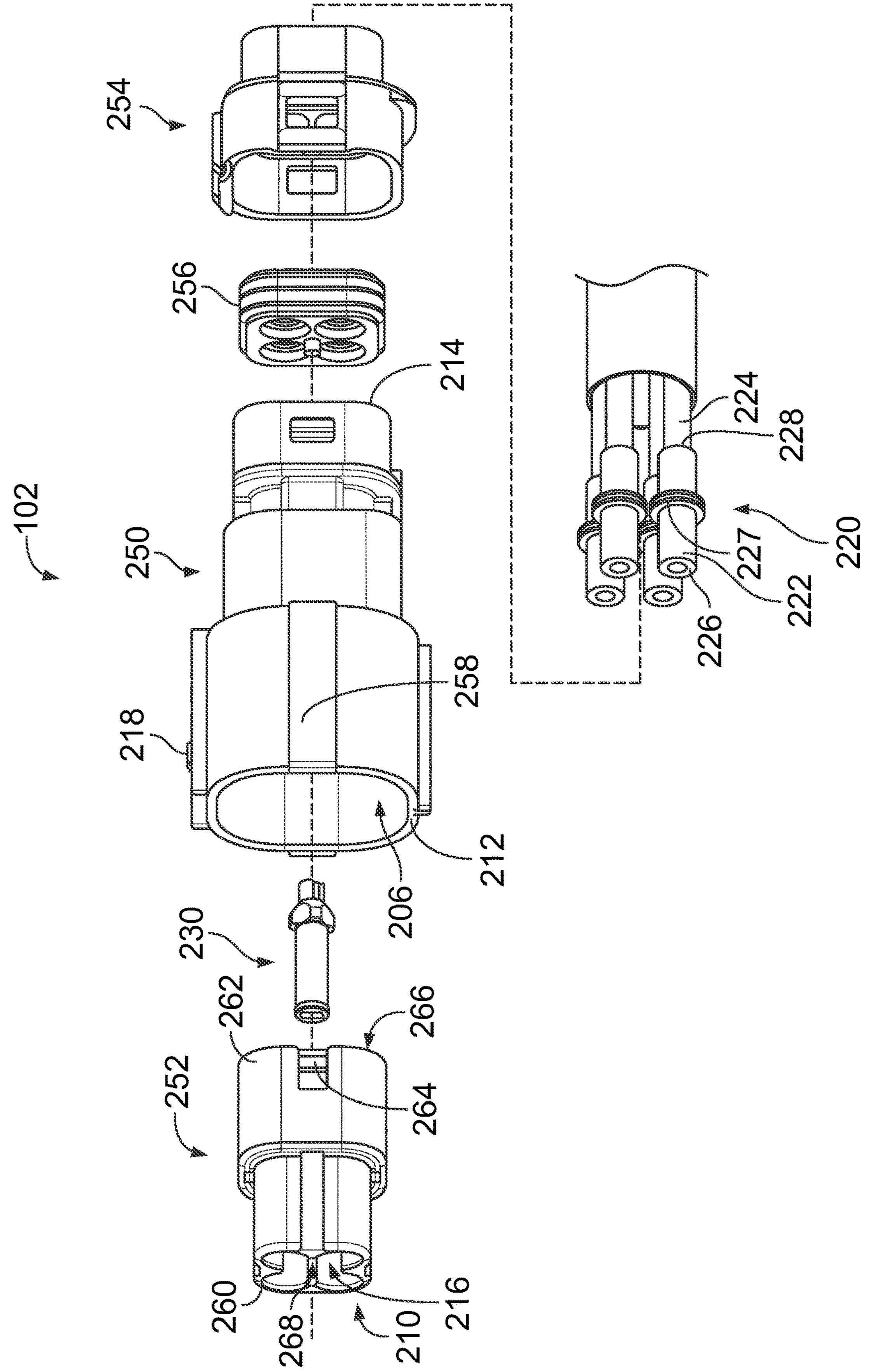
FIG. 2 is an exploded view of the first electrical connector in accordance with an exemplary embodiment.

FIG. 2 is an exploded view of the first electrical connector 102 in accordance with an exemplary embodiment. The electrical connector 102 includes the contact assembly 220 and the TPA device 230 configured to be received in the cavity 206 of the housing 210. In the illustrated embodiment, the contact assembly 220 includes four of the contacts 222 and corresponding cables 224. However, greater or fewer contacts 222 and cables 224 may be provided in alternative embodiments. For example, the contact assembly 220 may be a two position, three position, six position, eight position, or other type of contact assembly 220. In various embodiments, the TPA device 230 may be positioned to interface with all of the contacts 222 of the contact assembly 220. In other various embodiments, multiple TPA devices 230 may be provided to interface with corresponding subsets of the contacts 222.

In an exemplary embodiment, the contacts 222 are socket contacts. However, other types of contacts may be used in alternative embodiments, such as pin contacts. Each contact 222 extends between a mating end 226 and a terminating end 228. The mating end 226 is configured to be mated with the corresponding receptacle contacts 122 (FIG. 1). The terminating end 228 is terminated to the corresponding cable 224. For example, the terminating end 228 may include a crimp barrel crimped to the cable 224. Other types of terminations may be used in alternative embodiments. In an exemplary embodiment, each contact 222 includes a retention feature 227 along the contact 222. In the illustrated embodiment, the retention feature 227 is a flange extending radially outward from the exterior surface of the contact 222. The flange may have a forward-facing surface and a rearward facing surface. The TPA device 230 is configured to interface with the retention feature 227, such as the rearward facing surface of the flange to hold the contact 222 in the housing 210. Optionally, each of the cables 224 may be held within a common cable jacket, which is partially removed to expose the ends of the individual cables 224. The cables 224 may be coaxial cables in various embodiments. Optionally, the cables 224 may be shielded cables.

In an exemplary embodiment, the housing 210 is a multipiece housing. For example, the housing 210 includes an outer housing 250, an inner housing 252, and an end cap or ferrule 254 provided at the cable end 214. The ferrule 254 may provide strain relief for the cables 224. The ferrule 254 may be used to hold a cable seal 256 in the cavity 206 of the outer housing 250.

The outer housing 250 extends between the mating ends 212 and the cable end 214. The outer housing 250 defines the cavity 206. In the illustrated embodiment, the outer housing 250 is generally rectangular shaped having opposite first and second sides that extend between a top and a bottom of the outer housing 250. The sides and/or the top and/or the bottom may be generally flat. Optionally, the corners of the outer housing 250 may be curved rather than being right angles. The outer housing 250 includes keys 258 extending along one or both of the sides and/or the bottom and/or the top. The keys 258 may be used for keyed mating with the second electrical connector 104 (FIG. 1). The latching element 218 is located at the top; however, other locations are possible in alternative embodiments. In an exemplary embodiment, the cavity 206 is open at the front and the rear of the outer housing 250. Optionally, the outer housing 250 may be stepped inward such that the outer housing 250 has a larger size of the mating ends 212 and a smaller size at the cable end 214.

The inner housing 252 is configured to be received in the cavity 206 of the outer housing 250. For example, the inner housing 252 may be front loaded into the cavity 206. The TPA device 230 is configured to be received in the cavity 206 of the outer housing 250. Optionally, the TPA device 230 may be received in the inner housing 252 prior to loading the inner housing 252 into the cavity 206. Alternatively, the inner housing 252 may be loaded onto the TPA device 230 after the TPA device 230 is positioned in the cavity 206. The contact assembly 220 is configured to be received in the cavity 206 of the outer housing 250. For example, the contact assembly 220 may be rear loaded into the cavity 206. Optionally, the contacts 222 and the cables 224 of the contact assembly 220 may be loaded into corresponding openings in the cable seal 256 prior to loading into the cavity 206.

In an exemplary embodiment, the outer housing 250 entirely surrounds the cavity 206 to provide a sealed environment for the contact assembly 220 within the cavity 206. For example, the mating end 212 of the outer housing 250 may be sealed to the seal 140 (FIG. 1) of the second electrical connector 104 and the cable seal 256 may seal the cable end 214 such that a sealed environment is provided for the contact assembly 220 between the mating ends 212 and the cable end 214. In an exemplary embodiment, the outer housing 250 is devoid of any openings along the sides and/or the top and/or the bottom of the outer housing 250 that could jeopardize the sealed environment. For example, the outer housing 250 does not include any openings to receive a side actuated TPA device that would conventionally be accessible and actuated from a side of the housing. In contrast, the TPA device 230 is received in the cavity 206 and is accessible at the mating end 212 (for example, the front) after the contact assembly 220 is loaded into the cavity 206 and prior to mating with the second electrical connector 104.

The inner housing 252 extends between a front 260 and a rear 262. The inner housing 252 may be generally rectangular shaped having opposite sides extending between a top and a bottom. Optionally, corners of the inner housing 252 may be rounded. In various embodiments, the inner housing 252 is stepped having a smaller size at the front and a larger size at the rear. The inner housing 252 may have other shapes in alternative embodiments. In an exemplary embodiment, the inner housing 252 includes latching features 264 at the rear 262 configured to be latchably coupled to corresponding latches (not shown) of the outer housing 250 to secure the inner housing 252 in the outer housing 250. The inner housing 252 includes a pocket 266 at the rear 262 that receives the contact assembly 220.

The inner housing 252 includes the contact channels 216 and a TPA bore 268 extending through the inner housing 252. The TPA bore 268 is configured to receive the TPA device 230. The TPA bore 268 may be centered within the inner housing 252, such as along a central longitudinal axis of the inner housing 252. The contact channels 216 are located at the front 260 of the inner housing 252. The contact channels 216 open to the pocket 266 to receive the contacts 222 of the contact assembly 220. The contact channels 216 extend along channel axes, which extend generally along the longitudinal axis of the first electrical connector 102. In the illustrated embodiment, four of the contact channels 216 are provided in the inner housing 252. The contact channels 216 are arranged in different quadrants (for example, NW, NE, SE, SW) of the inner housing 252. The contact channels 216 are located in the four corners of the inner housing 252. The contact channels 216 are generally cylindrical. The material of the inner housing 252 extends at least partially circumferentially around each of the contact channels 216. In the illustrated embodiment, the material of the inner housing 252 extends around the radially outer portions of each of the contact channels 216. Radially inner portions of each of the contact channels 216 may be open to the TPA bore 268 such that the TPA device 230 is able to interface with the contacts 222 when the contacts 222 are located within the contact channels 216. Optionally, the material of the inner housing 252 may extend around a majority of each of the contact channels 216. In the illustrated embodiment, the material of the inner housing 252 extends around approximately 270° of each of the contact channels 216 while approximately 90° of each of the contact channels 216 is open to the TPA bore 268.

Figure 3:
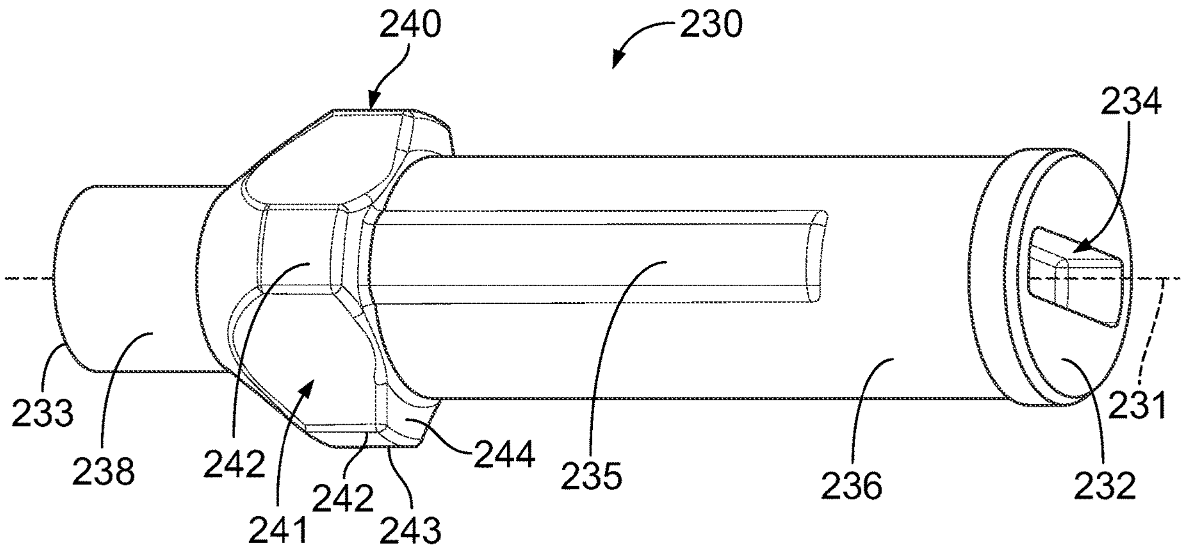
FIG. 3 is a front perspective view of the TPA device in accordance with an exemplary embodiment.
Figure 4:
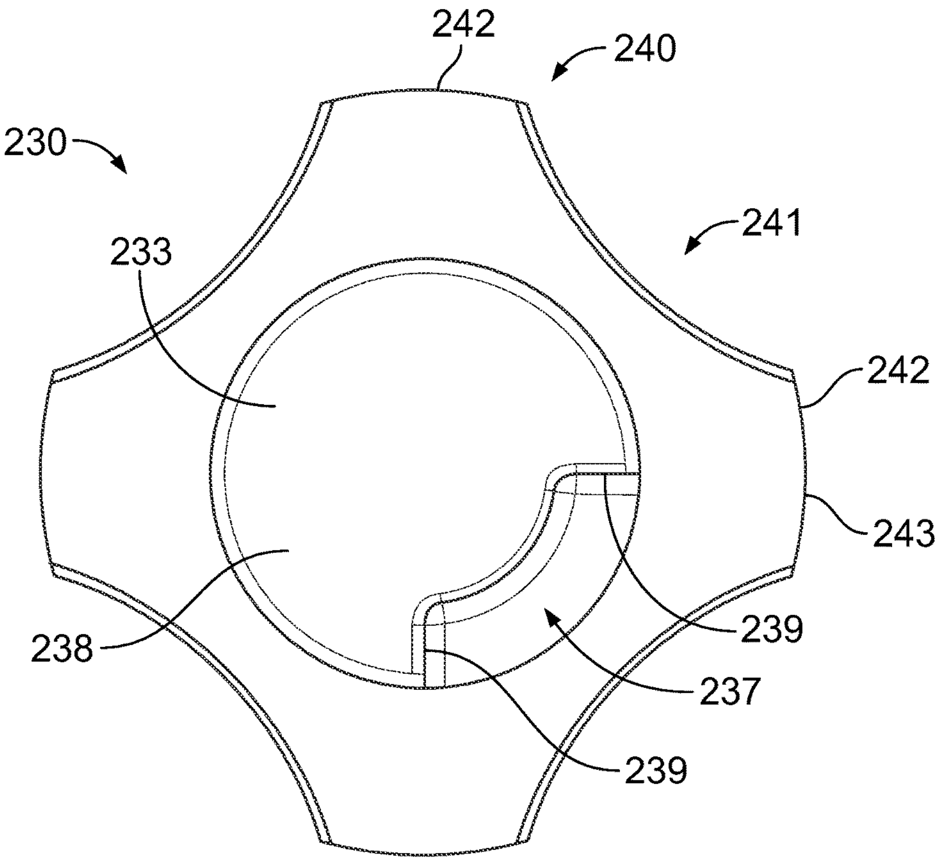
FIG. 4 is a rear end view of the TPA device in accordance with an exemplary embodiment.

FIG. 3 is a front perspective view of the TPA device 230 in accordance with an exemplary embodiment. FIG. 4 is a rear end view of the TPA device 230 in accordance with an exemplary embodiment. The TPA device 230 is a generally cylindrical structure extending along an axis 231 between a front 232 and a rear 233 of the TPA device 230.

The TPA device 230 includes a drive element 234 at the front 232. The drive element 234 is used to actuate or move the TPA device 230 between the clearance position and the blocking position. For example, the operator interfaces with the drive element 234 to rotate the TPA device 230 about the longitudinal axis between the clearance position and the blocking position. In the illustrated embodiment, the drive element 234 is a slot configured to receive a tool, such as a screwdriver. Other types of drive elements may be used in alternative embodiments.

The TPA device 230 includes a barrel 236 at the front 232 and a mounting shaft 238 at the rear 233. The TPA device 230 includes a hub 240 between the barrel 236 and the mounting shaft 238. The hub 240 may be longitudinally offset along the TPA device 230, such as closer to the rear 233. The hub 240 is used to interface with the contacts 222 (FIG. 2) to assure that the contacts 222 are properly positioned in the housing 210 and used to hold the contacts 222 in the housing 210.

The barrel 236 may be generally cylindrical shaped. The barrel 236 is configured be received in the TPA bore 268 (FIG. 2). The barrel 236 is rotatable within the TPA bore 268. In an exemplary embodiment, the TPA device 230 includes an indexing rib 235 extending along the barrel 236.

The indexing rib 235 is configured to interface with the inner housing 252 to control the rotational position of the TPA device 230 relative to the inner housing 252.

The mounting shaft 238 may be generally cylindrical shaped. The mounting shaft 238 is configured to be received in a mounting opening of the housing 210 (FIG. 2), such as in the outer housing 250. The housing 210 supports the mounting shaft 238. The mounting shaft 238 is rotatable within the mounting opening. In an exemplary embodiment, the TPA device 230 includes an index pocket 237 at the rear 233. The index pocket 237 includes stop surfaces 239 that limit rotation of the mounting shaft 238 relative to the housing 210 and the mounting opening.

The hub 240 includes a plurality of locking lobes 242 circumferentially spaced apart around the hub 240. Terminal cutouts 241 are located between the locking lobes 242. The terminal cutouts 241 are shaped to receive the contacts 222. For example, the terminal cutouts 241 provide spaces four allowing the contacts 222 to move axially relative to the TPA device 230, such as during assembly of the electrical connector 102 (for example, loading of the contacts 222 into the inner housing 252). In the illustrated embodiment, the terminal cutouts 241 have a curvature. The curvature may match the radius of curvature of the contacts 222. The locking lobes 242 extend radially outward from the hub 240. The locking lobes 242 stand proud of the barrel 236. The locking lobes 242 have distal ends 243 and a blocking surfaces 244 extending between the barrel 236 and the distal ends 243. The blocking surfaces 244 are forward facing. The blocking surfaces 244 are configured to interface with the contacts 222 when the TPA device 230 is in the blocking position. In the illustrated embodiment, four of the locking lobes 242 and four of the terminal cutouts 241 are provided. However, greater or fewer locking lobes 242 and terminal cutouts 241 may be provided in alternative embodiments. The locking lobes 242 are spaced equidistant from each other (for example, N, S, E, W).

Figure 5:
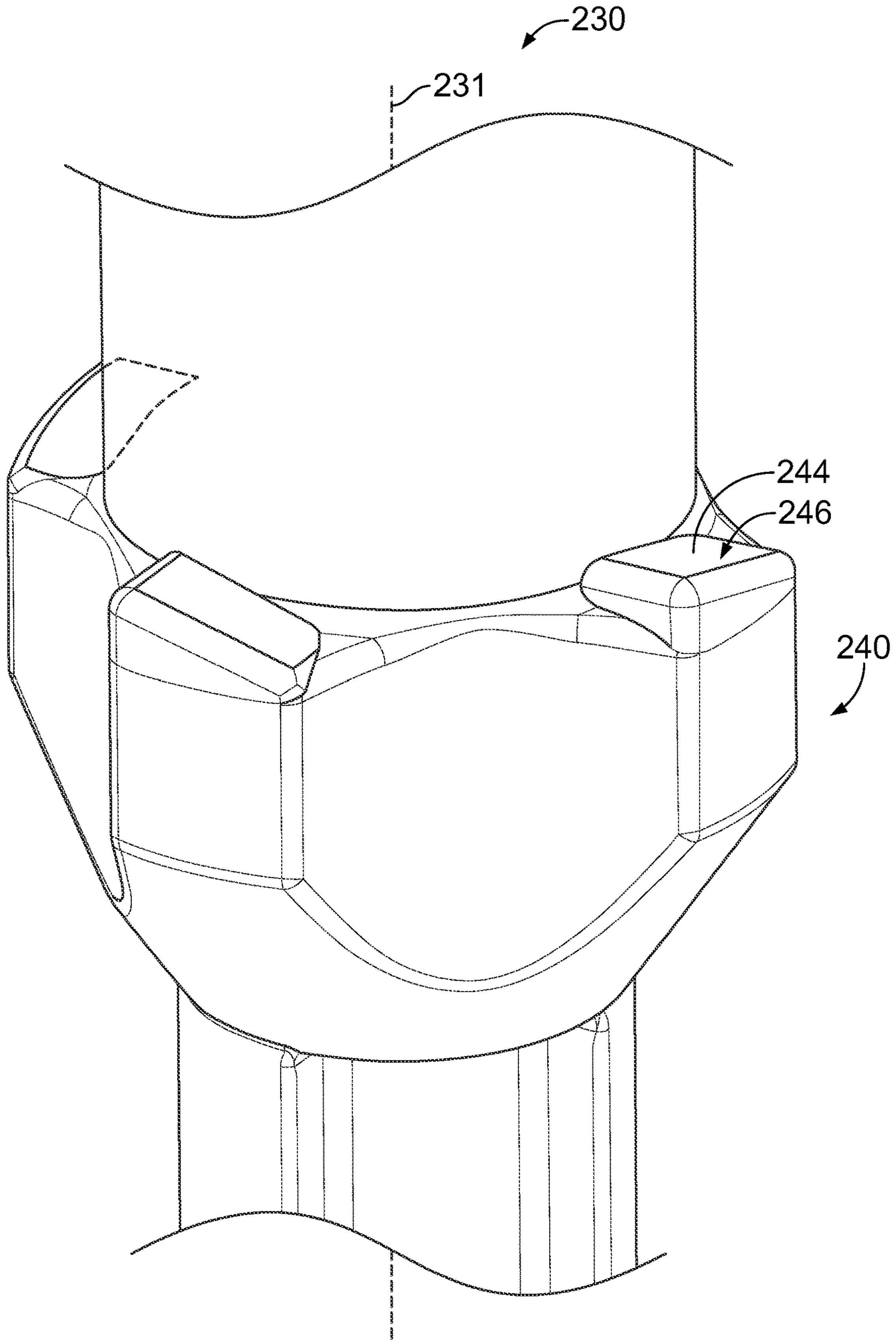
FIG. 5 is a perspective view of a portion of the TPA device showing the hub in accordance with an exemplary embodiment.

FIG. 5 is a perspective view of a portion of the TPA device 230 showing the hub 240 in accordance with an exemplary embodiment. In the illustrated embodiment, the hub 240 includes ramps 246 along the blocking surfaces 244. The ramps 246 are angled transverse (for example, non-perpendicular) to the axis 231. The ramps 246 are configured to engage the contacts 222 (FIG. 2) in the blocking position to forward bias the contacts 222 relative to the housing 210. For example, the ramps 246 may drive the contacts 222 in a forward direction to forward position the contacts 222 relative to the housing 210. The ramps 246 ensure that the contacts 222 are fully mated with the mating contacts of the second electrical connector 104 and reduces air gaps between the contacts and the mating contacts when mated to improve electrical performance, such as by lowering impedance along the data paths.

Figure 6:
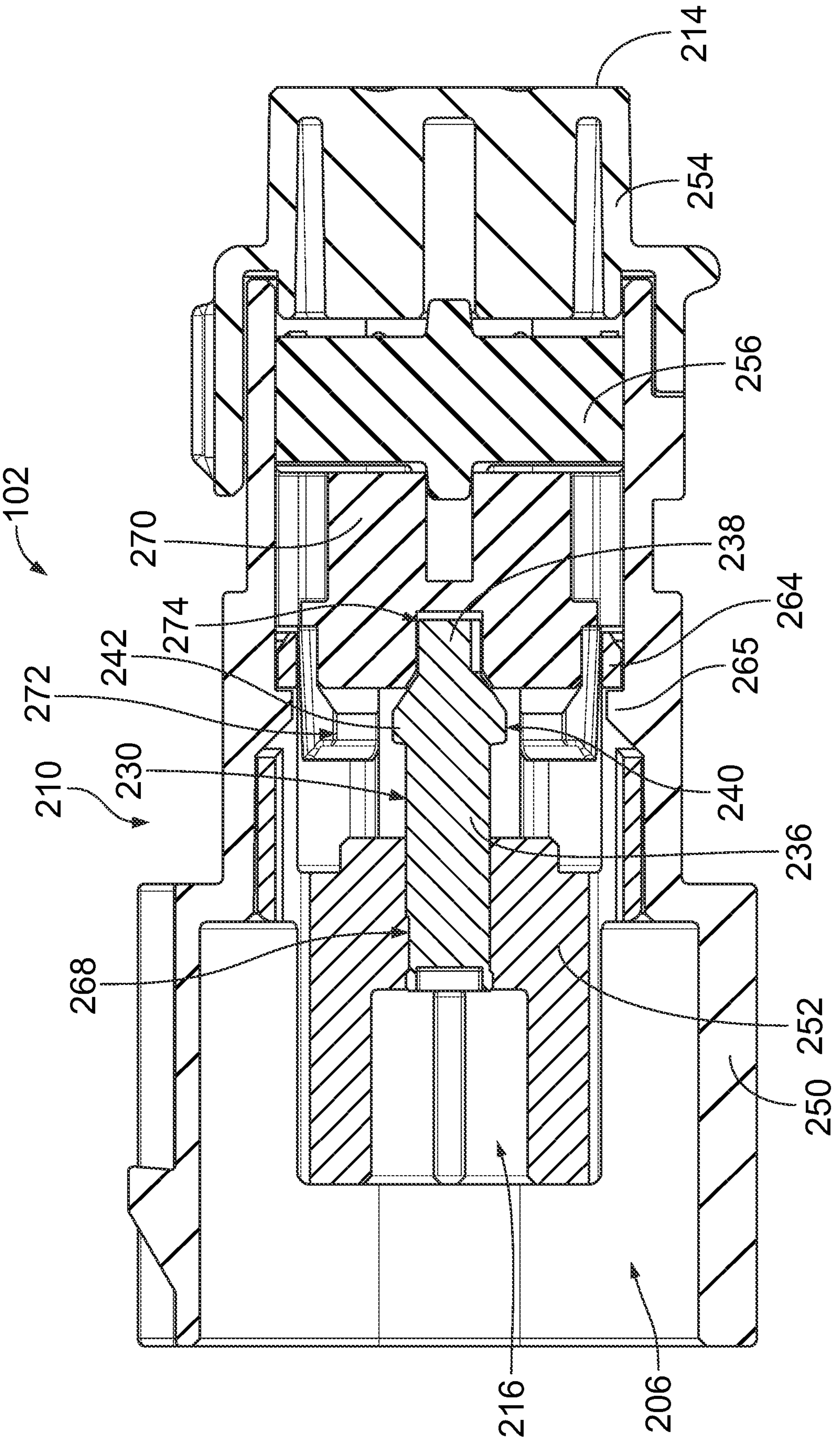
FIG. 6 is a cross-sectional view of a portion of the electrical connector in accordance with an exemplary embodiment.

FIG. 6 is a cross-sectional view of a portion of the electrical connector 102 in accordance with an exemplary embodiment. The contact assembly 220 has been removed to illustrate other components of the electrical connector 102, such as the TPA device 230 relative to the housing 210. FIG. 6 illustrates the inner housing 252 received in the cavity 206 of the outer housing 250 and coupled thereto. For example, latches 265 of the outer housing 250 engage the latching features 264 of the inner housing 252 to secure the inner housing 252 in the outer housing 250. A rear portion of the inner housing 252 extends into a rear portion of the cavity 206. A forward portion of the inner housing 252 extends into a front portion of the cavity 206. A space is defined around the forward portion of the inner housing 252 to receive a portion of the second electrical connector 104 in the front portion of the cavity 206. The ferrule 254 is shown coupled to the cable end 214 of the outer housing 250. A portion of the ferrule 254 may extend into the rear portion of the cavity 206 to hold the cable seal 256 in the cavity 206.

In an exemplary embodiment, the housing 210 includes a contact holder 270 in the cavity 206 rearward of the inner housing 252. The contact holder 270 is used to hold the contacts 222 and/or the cables 224 of the contact assembly 220. In an exemplary embodiment, the contact holder 270 may include latches (not shown) that are used to latchably secure the contacts 222 within the housing 210. In various embodiments, the contact holder 270 is separate and discrete from the outer housing 250 and configured to be loaded into the cavity 206, such as through the rear. For example, the contacts 222 and the cables 224 may be preassembled into the contact holder 270 prior to loading the contact holder 270 into the cavity 206. However, in alternative embodiments, the contact holder 270 may be integral with the outer housing 250, such as being molded with the outer housing 250. The contact holder 270 includes channels 272 that receive the contacts 222 and/or the cables 224. In various embodiments, the contacts 222 may be rear loaded into the channels 272. In alternative embodiments, the contacts 222 may be side loaded into the channels 272, such as through slots at the sides of the contact holder 270. In an exemplary embodiment, the contact holder 270 includes a mounting opening 274 at the front that receives the mounting shaft 238 of the TPA device 230. The mounting shaft 238 is rotatable within the mounting opening 274.

The TPA device 230 is held in the housing 210, such as in the contact holder 270 and the inner housing 252. The barrel 236 of the TPA device 230 is received in the TPA bore 268. The TPA device 230 is rotatable within the TPA bore 268. The TPA device 230 is located between all of the contact channels 216, such as along the central axis of the inner housing 252. The hub 240 is aligned with the contact channels 216 and is configured to extend into the contact channels 216 to interface with the contacts 222. For example, the locking lobes 242 are rotatable into and out of the contact channels 216. The locking lobes 242 are movable along an arcuate path between the clearance position and the blocking position.

Figure 8:
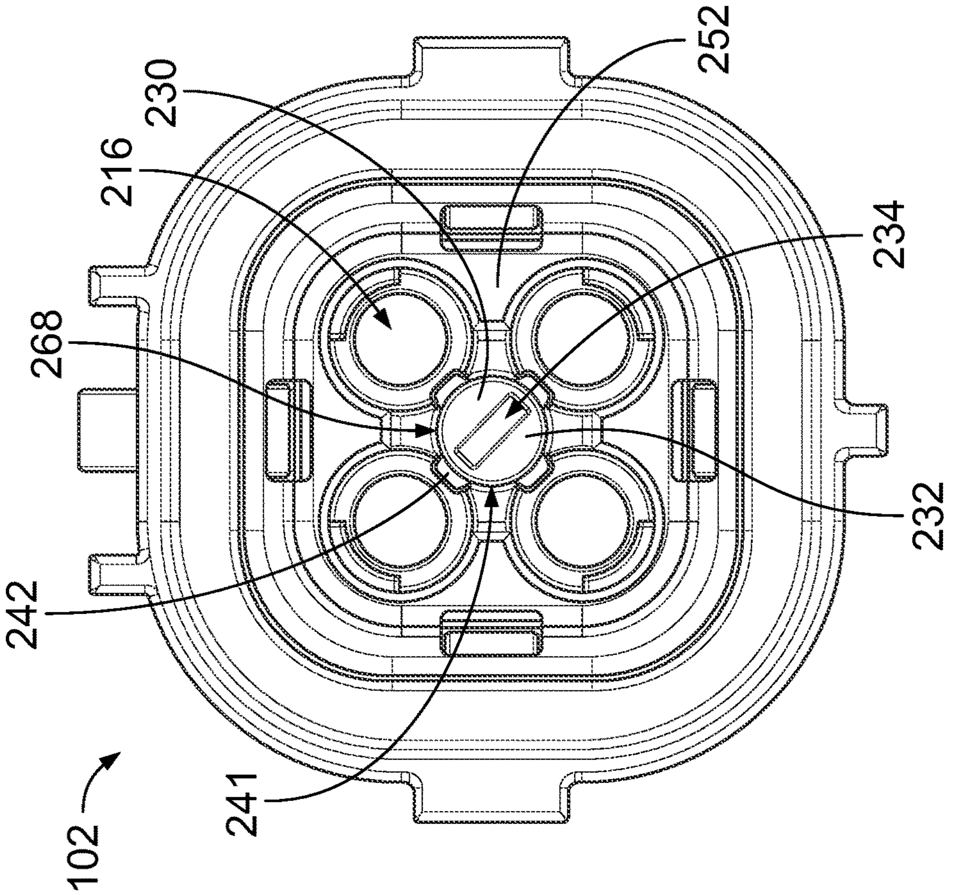
FIG. 8 is a front view of a portion of the electrical connector in accordance with an exemplary embodiment showing the TPA device in the blocking position.
Figure 7:
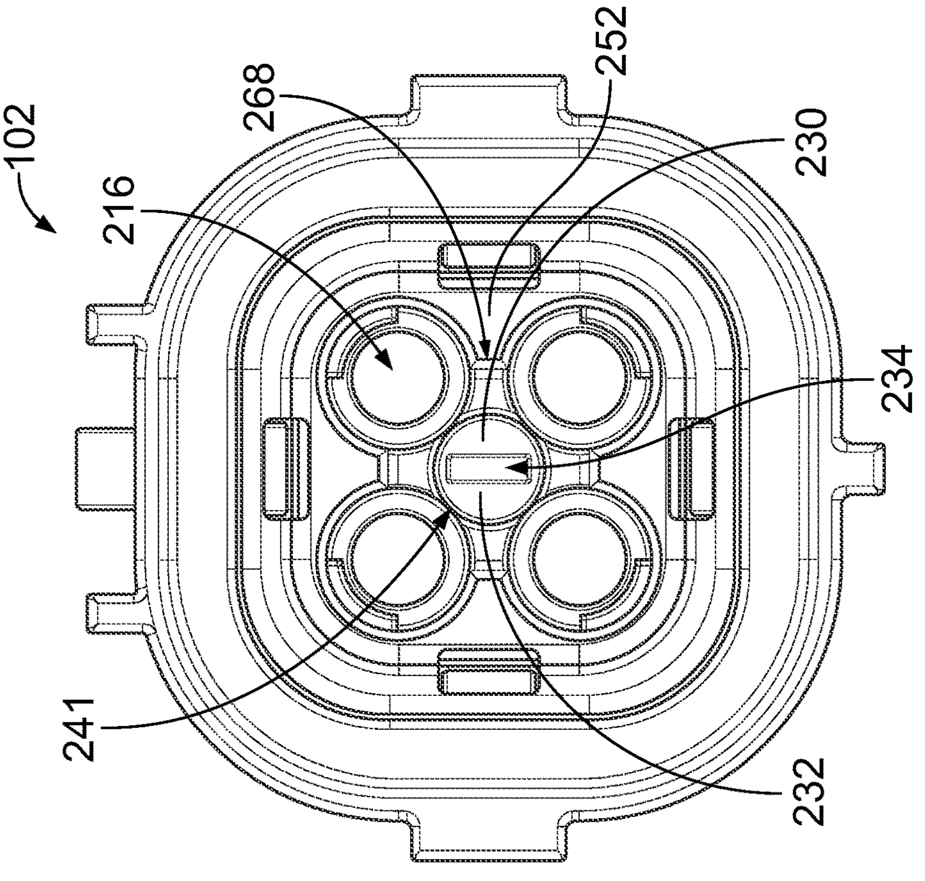
FIG. 7 is a front view of a portion of the electrical connector in accordance with an exemplary embodiment showing the TPA device in the clearance position.

FIG. 7 is a front view of a portion of the electrical connector 102 in accordance with an exemplary embodiment showing the TPA device 230 in the clearance position. FIG. 8 is a front view of a portion of the electrical connector 102 in accordance with an exemplary embodiment showing the TPA device 230 in the blocking position. The contact assembly 220 has been removed to illustrate other components of the electrical connector 102, such as the TPA device 230.

The TPA device 230 is located in the TPA bore 268 of the inner housing 252. The TPA device 230 is rotatable within the TPA bore 268 between the clearance position and the blocking position. For example, the drive element 234 at the front 232 of the TPA device 230 may be engaged by a tool to rotate the TPA device 230. The locking lobes 242 extend radially outward from the hub 240. The locking lobes 242 are rotatable and movable along an arcuate path between the clearance position in the blocking position. The locking lobes 242 extend into the contact channels 216 in the blocking position. The locking lobes 242 are offset from the contact channels 216 in the clearance position. The terminal cutouts 241 are aligned with the contact channels 216 in the clearance position to allow the contacts 222 to slide into and out of the contact channels 216 when the TPA device 230 is in the clearance position. In the illustrated embodiment the TPA device 230 is rotated approximately 45° between the clearance position in the blocking position. For example, the locking lobes 242 are moved from N-S-E-W orientations in the clearance position to NE-NW-SE-SW orientations in the blocking position. Other angular positions are possible in alternative embodiments.

Figure 9:
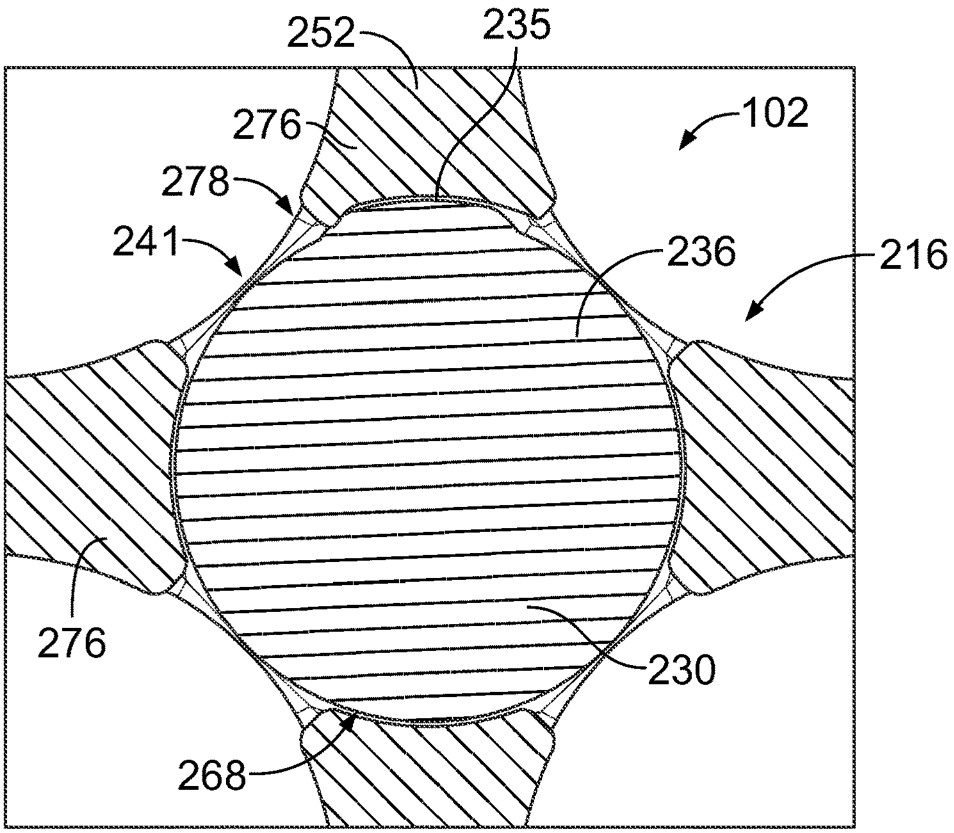
FIG. 9 is a cross-sectional view of a portion of the electrical connector in accordance with an exemplary embodiment showing the TPA device in the clearance position relative to the inner housing.
Figure 10:
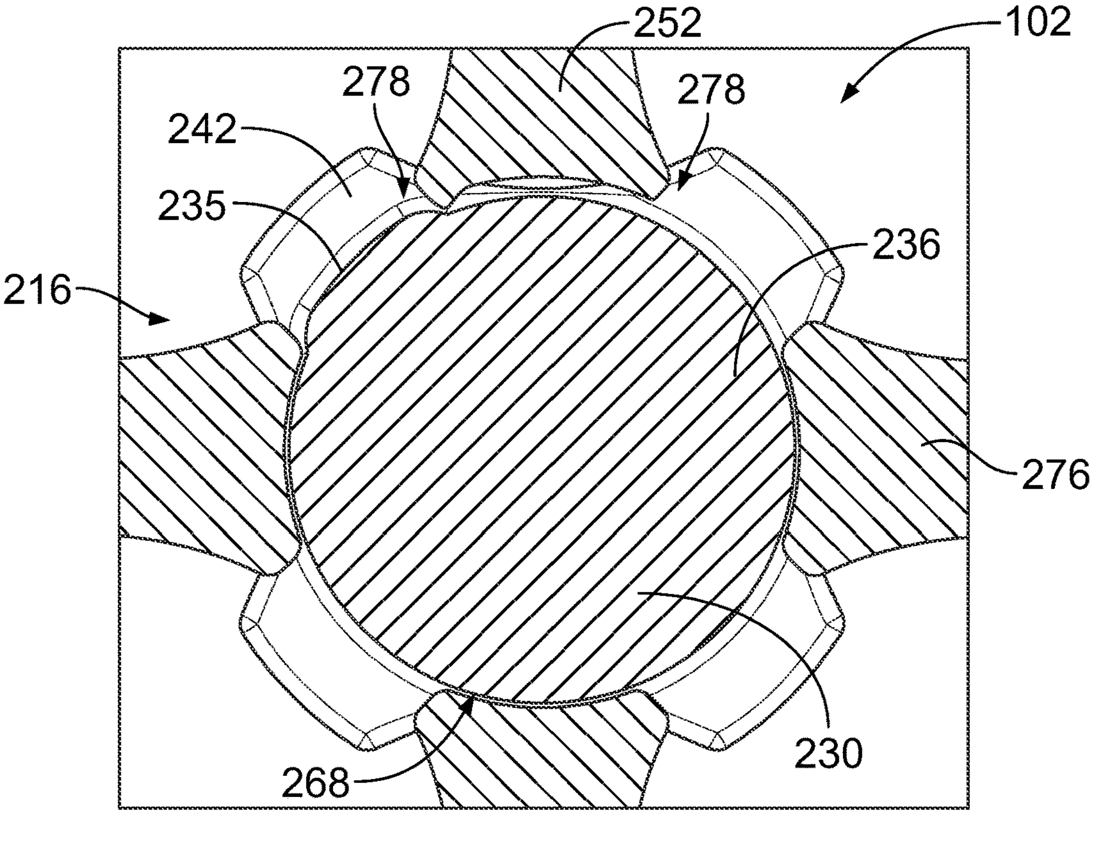
FIG. 10 is a cross-sectional view of a portion of the electrical connector in accordance with an exemplary embodiment showing the TPA device in the blocking position relative to the inner housing.

FIG. 9 is a cross-sectional view of a portion of the electrical connector 102 in accordance with an exemplary embodiment showing the TPA device 230 in the clearance position relative to the inner housing 252. FIG. 10 is a cross-sectional view of a portion of the electrical connector 102 in accordance with an exemplary embodiment showing the TPA device 230 in the blocking position relative to the inner housing 252.

The TPA device 230 is located in the TPA bore 268 of the inner housing 252. The inner housing 252 includes webs 276 of material between the contact channels 216. Openings 278 are located between the webs 276. The openings 278 are open to the contact channels 216 and the TPA bore 268. The TPA device 230 is rotatable within the TPA bore 268 between the clearance position and the blocking position. The locking lobes 242 are offset from the contact channels 216 in the clearance position. For example, the locking lobes 242 are aligned with the webs 276 in the clearance position. The webs 276 are located forward of the locking lobes 242 in the clearance position. The terminal cutouts 241 are aligned with the contact channels 216 in the clearance position to allow the contacts 222 to slide into and out of the contact channels 216 when the TPA device 230 is in the clearance position. The locking lobes 242 extend through the openings 278 into the contact channels 216 in the blocking position.

In an exemplary embodiment, the indexing rib 235 extends radially outward from a side of the barrel 236. The indexing rib 235 may be aligned with one of the locking lobes 242. The indexing rib 235 is configured to engage the inner housing 252 to control the rotational position of the TPA device 230 relative to the inner housing 252. The indexing rib 235 engages one of the webs 276 in the clearance position. The web 276 may be shaped to receive the indexing rib 235, such as including a pocket or other cutout to receive the indexing rib 235. The indexing rib 235 is received in one of the openings 278 in the blocking position. The web 276 may partially block movement of the indexing rib 235 from the clearance position to the blocking position and/or from the blocking position to the clearance position. For example, a predetermined force may be required to overcome the blocking force of the web 276 to rotate the TPA device 230. The web 276 prevents the TPA device 230 from inadvertently moving between the blocking position and the clearance position. The force from the driver tool may be sufficient to overcome the friction force holding the indexing rib 235 in the blocking position or the clearance position. In an exemplary embodiment, the indexing rib 235 provides a snap or click as the indexing rib 235 moves between the blocking position and the clearance position. Such snap or click may provide audible and/or tactile feedback to the operator of such position change.

Figure 11:
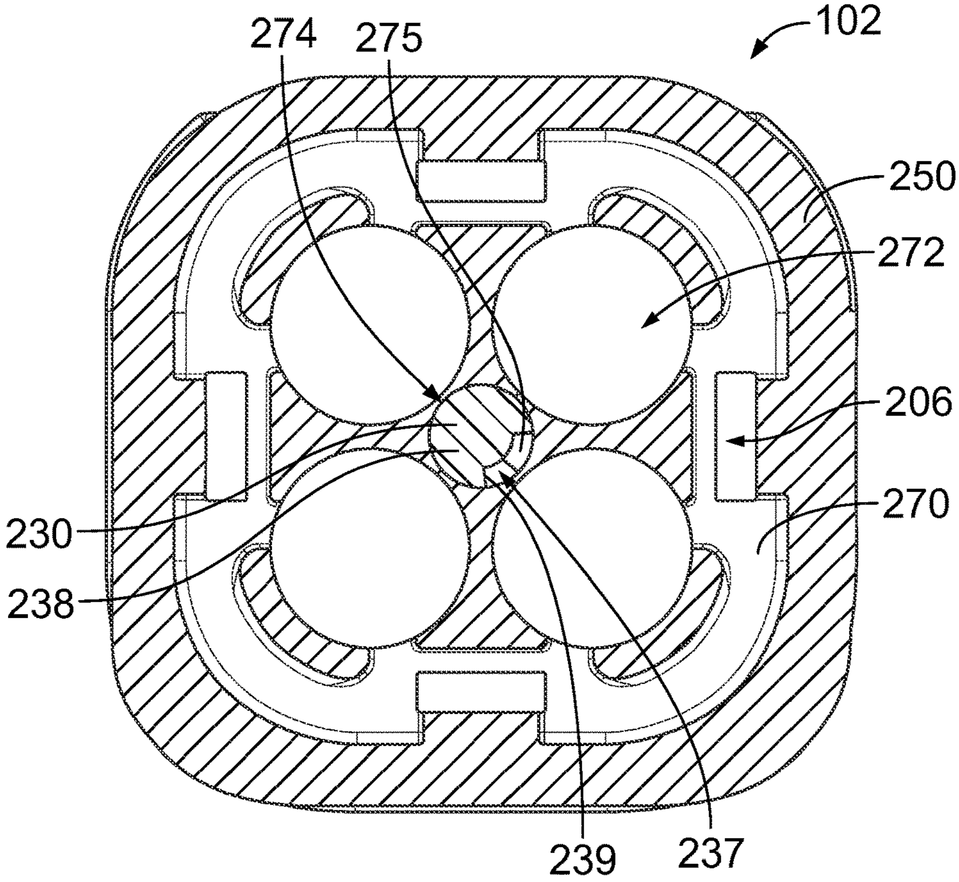
FIG. 11 is a cross-sectional view of a portion of the electrical connector in accordance with an exemplary embodiment showing the TPA device in the clearance position relative to the outer housing and/or the contact holder.
Figure 12:
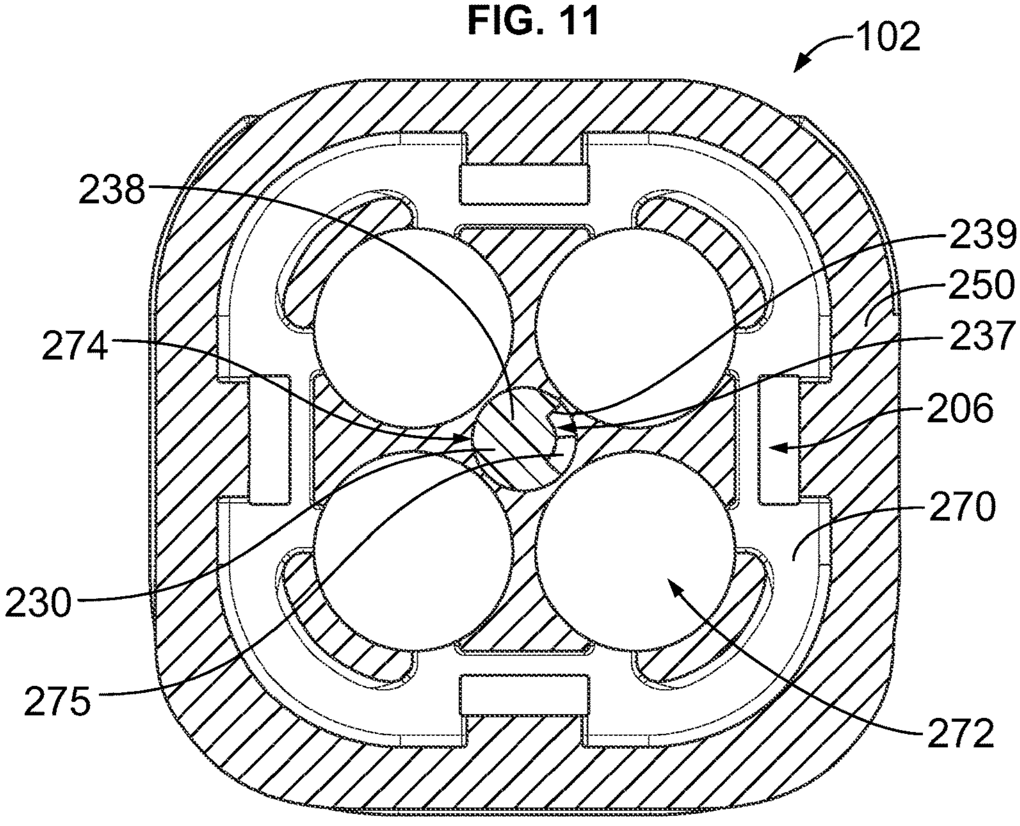
FIG. 12 is a cross-sectional view of a portion of the electrical connector in accordance with an exemplary embodiment showing the TPA device in the blocking position relative to the outer housing and/or the contact holder.

FIG. 11 is a cross-sectional view of a portion of the electrical connector 102 in accordance with an exemplary embodiment showing the TPA device 230 in the clearance position relative to the outer housing 250 and/or the contact holder 270. FIG. 12 is a cross-sectional view of a portion of the electrical connector 102 in accordance with an exemplary embodiment showing the TPA device 230 in the blocking position relative to the outer housing 250 and/or the contact holder 270.

In the illustrated embodiment, the contact holder 270 is shown as separate and discrete from the outer housing 250. The contact holder 270 is sized and shaped to fit in the cavity 206 of the outer housing 250. The contact holder 270 includes the channels 272 configured to receive the contacts 222 and/or the cables 224. The contact holder 270 includes the mounting opening 274 that receives the mounting shaft 238 of the TPA device 230. In an exemplary embodiment, the contact holder 270 includes an index key 275 extending into the mounting opening 274. The index key is a protrusion extending radially inward at a predetermined location. The index key 275 is used to index for orienting the TPA device 230 relative to the outer housing 250. The index key 275 is received in the index pocket 237 in the mounting shaft 238. The mounting shaft 238 is rotatable within the mounting opening 274. However, the index key 275 controls a rotational limit of the TPA device 230 relative to the contact holder 270. For example, the mounting shaft 238 may be rotated until the stop surfaces 239 engage the index key 275.

Figure 13:
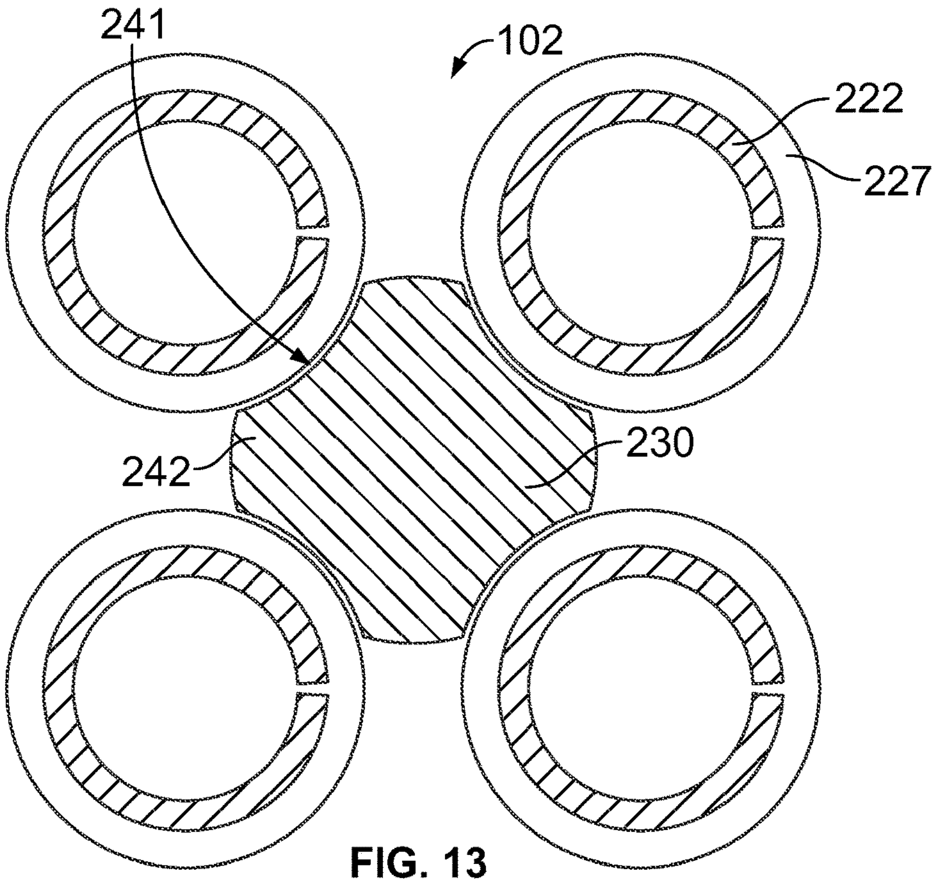
FIG. 13 is a cross-sectional view of a portion of the electrical connector in accordance with an exemplary embodiment showing the TPA device in the clearance position relative to the contacts.
Figure 14:
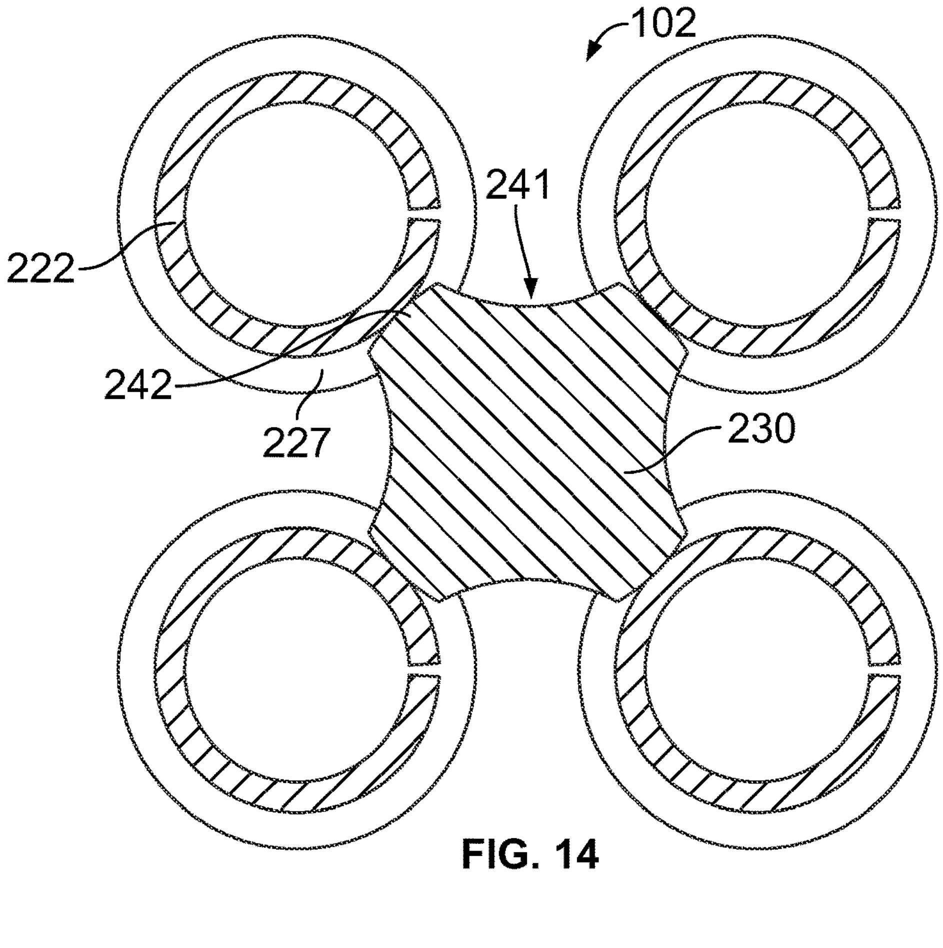
FIG. 14 is a cross-sectional view of a portion of the electrical connector in accordance with an exemplary embodiment showing the TPA device in the blocking position relative to the contacts.

FIG. 13 is a cross-sectional view of a portion of the electrical connector 102 in accordance with an exemplary embodiment showing the TPA device 230 in the clearance position relative to the contacts 222. FIG. 14 is a cross-sectional view of a portion of the electrical connector 102 in accordance with an exemplary embodiment showing the TPA device 230 in the blocking position relative to the contacts 222. The housing 210 is removed to illustrate the TPA device 230 relative to the contacts 222. The TPA device 230 is positioned relative to the contacts 222 to interface with the contacts 222 in the blocking position. For example, the TPA device 230 may be centered between the four contacts 222.

Each contact 222 includes the retention feature 227. The retention feature 222 is defined by a flange in the illustrated embodiment. The TPA device 230 is rotatable relative to the contacts 222 between the clearance position and the blocking position. The locking lobes 242 are rotatable and movable along an arcuate path between the clearance position in the blocking position. The locking lobes 242 are offset from the contact channels 216 in the clearance position. The terminal cutouts 241 are aligned with the contact channels 216 in the clearance position to allow the contacts 222 to slide into and out of the contact channels 216 when the TPA device 230 is in the clearance position.

The locking lobes 242 interface with the retention features 227 in the blocking position. For example, the locking lobes 242 are located immediately behind the retention features 227 in the blocking position. The locking lobes 242 block the contacts 222 from moving rearward in the blocking position when the locking lobes 242 block the retention features 227. In an exemplary embodiment, the locking lobes 242 include the ramps 246 (FIG. 5) that are configured to engage the contacts 222 in the blocking position to forward bias the contacts 222 relative to the housing 210. For example, the ramps 246 may drive the contacts 222 in a forward direction to forward position the contacts 222 relative to the housing 210.

Figure 16:
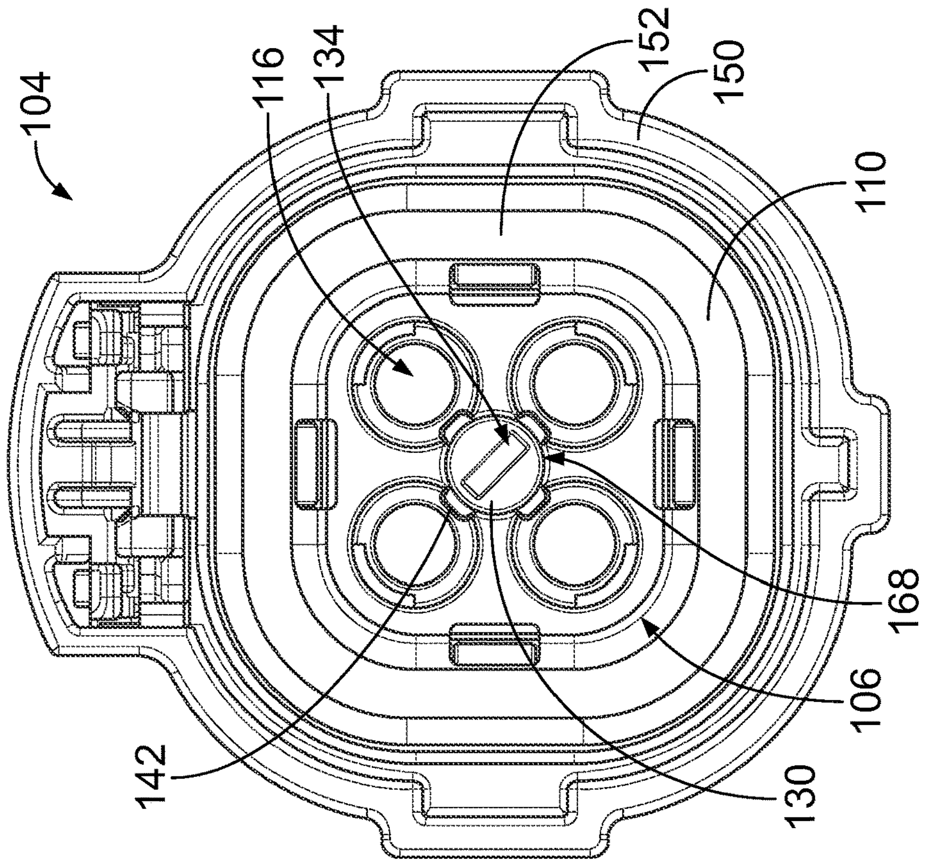
FIG. 16 is a front view of a portion of the second electrical connector in accordance with an exemplary embodiment showing the TPA device in the blocking position.
Figure 15:
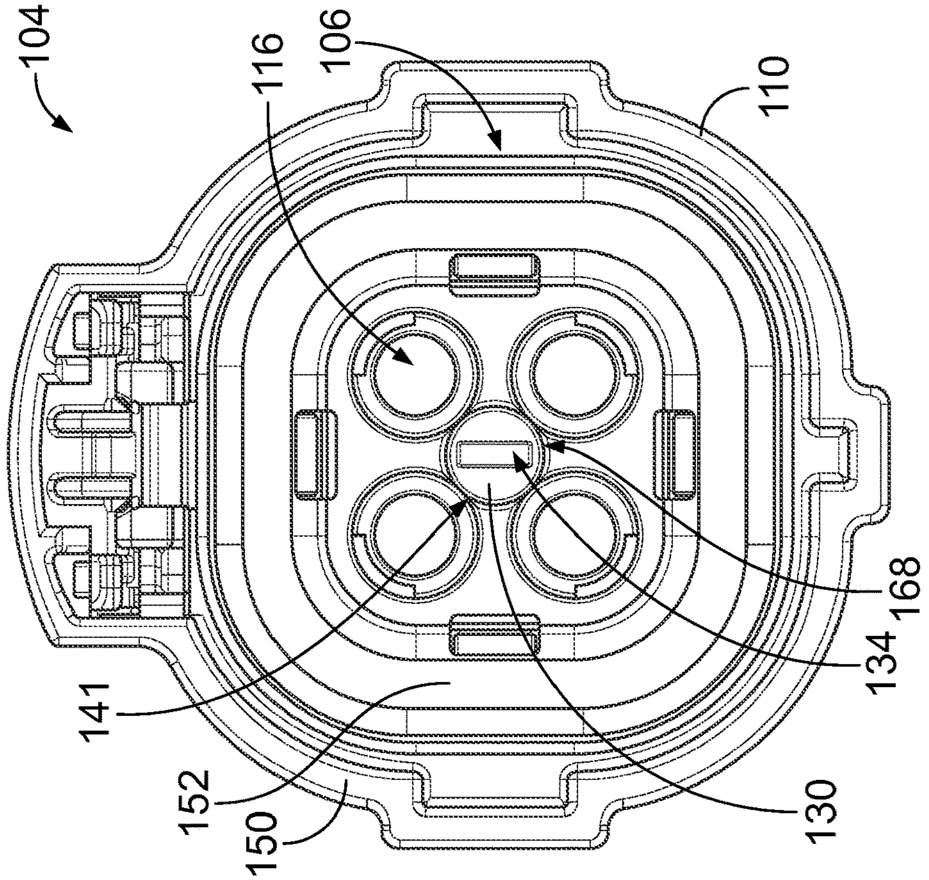
FIG. 15 is a front view of a portion of the second electrical connector in accordance with an exemplary embodiment showing the TPA device in the clearance position.

FIG. 15 is a front view of a portion of the second electrical connector 104 in accordance with an exemplary embodiment showing the TPA device 130 in the clearance position. FIG. 16 is a front view of a portion of the second electrical connector 104 in accordance with an exemplary embodiment showing the TPA device 130 in the blocking position.

The contact assembly 120 (FIG. 1) has been removed to illustrate other components of the electrical connector 102, such as the TPA device 130.

In an exemplary embodiment, the housing 110 is a multipiece housing. For example, the housing 110 includes an outer housing 150 and an inner housing 152. The outer housing 150 defines the cavity 106. The inner housing 152 is received in the cavity 106 of the outer housing 150. The inner housing 152 includes the contact channels 116 and a TPA bore 168 extending through the inner housing 152. The TPA bore 168 holds the TPA device 130. The TPA bore 168 may be centered within the inner housing 152, such as along a central longitudinal axis of the inner housing 152. Radially inner portions of each of the contact channels 116 may be open to the TPA bore 168 such that the TPA device 130 is able to interface with the contacts 122 when the contacts 122 are located within the contact channels 116.

The TPA device 130 is located in the TPA bore 168 of the inner housing 152. The TPA device 130 is rotatable within the TPA bore 168 between the clearance position and the blocking position. A drive element 134 at the front of the TPA device 130 may be engaged by a tool to rotate the TPA device 130. The TPA device 130 includes locking lobes 142 extending radially outward from a hub. The locking lobes 142 are rotatable and movable along an arcuate path between the clearance position in the blocking position. The locking lobes 142 extend into the contact channels 116 in the blocking position. The locking lobes 142 are offset from the contact channels 116 in the clearance position. Terminal cutouts 141, between the locking lobes 142, are aligned with the contact channels 116 in the clearance position to allow the contacts 122 to slide into and out of the contact channels 116 when the TPA device 130 is in the clearance position. In the illustrated embodiment the TPA device 130 is rotated approximately 45° between the clearance position in the blocking position. For example, the locking lobes 142 are moved from N-S-E-W orientations in the clearance position to NE-NW-SE-SW orientations in the blocking position. Other angular positions are possible in alternative embodiments.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector comprising:

a housing having a cavity, the housing having a mating end and a cable end, the housing having contact channels extending along channel axes;

a contact assembly received in the cavity, the contact assembly including contacts received in the corresponding contact channels, each contact having a retention feature; and a terminal position assurance (TPA) device received in the cavity, the TPA device extending along an axis parallel to the channel axes, the TPA device including locking lobes, each locking lobe configured to interface with the retention feature of the corresponding contact to hold the contact in the housing, the TPA device being rotatable about the axis relative to the housing between a clearance position and a blocking position, each locking lobe interfacing with the corresponding retention feature in the blocking position, wherein the TPA device includes cutouts between the locking lobes, the cutouts being aligned with the contact channels when the TPA device is in the clearance position, the retention features of the contacts movable through the cutouts when the TPA device is in the clearance position.

2. The electrical connector of claim 1, wherein the locking lobes are movable along an arcuate path between the clearance position and the blocking position.

3. The electrical connector of claim 1, wherein the locking lobes are offset from the contact channels in the clearance position and the locking lobes extending into the contact channels in the blocking position.

4. The electrical connector of claim 1, wherein the TPA device includes a hub including the locking lobes, the locking lobes extending radially outward from the hub.

5. The electrical connector of claim 1, wherein the TPA device includes a barrel extending along the axis, the TPA device including a drive element at a front of the barrel, the drive element been exposed at the mating ends of the housing for actuation by an operator.

6. The electrical connector of claim 1, wherein the TPA device includes an indexing rib, the indexing rib engaging the housing to control the rotational position of the TPA device relative to the housing.

7. The electrical connector of claim 1, wherein the housing includes an index key, the TPA device including an index pocket receiving the index key, the index key controlling a rotational limit of the TPA device relative to the housing.

8. The electrical connector of claim 1, wherein the TPA device is centered between the contact channels.

9. The electrical connector of claim 1, wherein the contact channels include a first contact channel and a second contact channel, the contacts including a first contact received in the first contact channel and a second contact received in the second contact channel, the locking lobes including a first locking lobe positioned in the first contact channel in the blocking position to engage the retention feature of the first contact and a second locking lobe positioned in the second contact channel in the blocking position to engage the retention feature of the second contact.

10. The electrical connector of claim 9, wherein the contact channels include a third contact channel and a fourth contact channel, the TPA device located between the first contact channel, the second contact channel, the third contact channel, and the fourth contact channel, the contacts including a third contact received in the third contact channel and a fourth contact received in the fourth contact channel, the locking lobes including a third locking lobe positioned in the third contact channel in the blocking position to engage the retention feature of the third contact and a fourth locking lobe positioned in the fourth contact channel in the blocking position to engage the retention feature of the fourth contact.

11. The electrical connector of claim 1, further comprising a cable seal received in the housing at the cable end to seal the cable end of the housing.

12. The electrical connector of claim 1, wherein the housing includes an outer perimeter between the mating end and the cable end, the outer perimeter being devoid of openings between the mating end and the cable end.

13. An electrical connector comprising:

an outer housing having a cavity, the outer housing extending between a mating end and a cable end, the outer housing including cable channels extending along cable channel axes;

an inner housing received in the cavity, the inner housing including contact channels extending along channel axes and being aligned with the cable channels, the inner housing including an inner bore located adjacent to the contact channels;

a contact assembly received in the cavity, the contact assembly including contacts received in the corresponding contact channels and cables terminated to the contacts received in the corresponding cable channels, each contact having a retention feature; and a terminal position assurance (TPA) device received in the cavity, the TPA device including a barrel and a hub, the barrel extending along an axis parallel to the channel axes, the barrel being received in the inner bore and located adjacent to the contacts in the contact channels, the hub including locking lobes extending radially outward from the hub, the TPA device being rotatable about the axis relative to the inner housing between a clearance position and a blocking position, the locking lobes being offset from the contact channels in the clearance position, the locking lobes being positioned in the contact channels in the blocking position for interfacing with the corresponding retention feature of the corresponding contact to hold the contact in the contact channel.

14. The electrical connector of claim 13, wherein the locking lobes are movable along an arcuate path between the clearance position and the blocking position.

15. The electrical connector of claim 13, wherein the TPA device includes a drive element at a front of the barrel, the drive element been exposed at the mating ends of the housing for actuation by an operator.

16. The electrical connector of claim 13, wherein the TPA device includes cutouts between the locking lobes, the cutouts being aligned with the contact channels when the TPA device is in the clearance position, the retention features of the contacts movable through the cutouts when the TPA device is in the clearance position.

17. A communication system comprising:

a receptacle connector including a receptacle housing having a cavity, the receptacle housing having a mating end and a cable end, the receptacle housing having receptacle contact channels extending along channel axes, the receptacle connector including a receptacle contact assembly received in the cavity of the receptacle housing, the receptacle contact assembly including receptacle contacts received in the corresponding receptacle contact channels, each receptacle contact having a retention feature, the receptacle connector including a receptacle terminal position assurance (TPA) device received in the cavity of the receptacle housing, the receptacle TPA device extending along an axis parallel to the channel axes, the receptacle TPA device including receptacle locking lobes, each receptacle locking lobe configured to interface with the retention feature of the corresponding receptacle contact to hold the receptacle contact in the receptacle housing, the receptacle TPA device being rotatable about the axis relative to the receptacle housing between a clearance position and a blocking position, each receptacle locking lobe interfacing with the retention feature of the corresponding receptacle contact in the blocking position; and a plug connector including a plug housing having a cavity, the plug housing having a mating end and a cable end, the mating end of the plug connector being plugged into the cavity of the receptacle housing at the mating end of the receptacle housing, the plug housing having plug contact channels extending along channel axes, the plug connector including a plug contact assembly received in the cavity of the plug housing, the plug contact assembly including plug contacts received in the corresponding plug contact channels, each plug contact having a retention feature, the plug connector including a plug terminal position assurance (TPA) device received in the cavity of the plug housing, the plug TPA device extending along an axis parallel to the channel axes, the plug TPA device including plug locking lobes, each plug locking lobe configured to interface with the retention feature of the corresponding plug contact to hold the plug contact in the plug housing, the plug TPA device being rotatable about the axis relative to the plug housing between a clearance position and a blocking position, each plug locking lobe interfacing with the retention feature of the corresponding plug contact in the blocking position.

18. The communication system of claim 17, wherein the locking lobes are movable along an arcuate path between the clearance position and the blocking position.

19. The communication system of claim 17, wherein the locking lobes are offset from the contact channels in the clearance position and the locking lobes are aligned with the contact channels in the blocking position.

* * * * *